(12) United States Patent
Murrow et al.

(10) Patent No.: US 8,596,892 B2
(45) Date of Patent: Dec. 3, 2013

(54) PAN AND TILT HEADS

(75) Inventors: Andrew Derek Murrow, Bury St. Edmunds (GB); Jolyon Francis Torbitt, Bury St. Edmunds (GB)

(73) Assignee: The Vitec Group PLC, Bury St Edmunds, Suffolk (GB)

( * ) Notice: Subject to any disclaimer, the term of this patent is extended or adjusted under 35 U.S.C. 154(b) by 650 days.

(21) Appl. No.: 12/750,037

(22) Filed: Mar. 30, 2010

(65) Prior Publication Data
US 2010/0243851 A1   Sep. 30, 2010

(30) Foreign Application Priority Data

Mar. 30, 2009   (GB) .................................. 0905470.1

(51) Int. Cl.
| G03B 17/00 | (2006.01) |
| H04N 5/225 | (2006.01) |
| F16M 11/02 | (2006.01) |
| F16M 11/04 | (2006.01) |
| A47G 29/00 | (2006.01) |

(52) U.S. Cl.
USPC ........ 396/428; 396/421; 348/373; 248/178.1; 248/187.1; 248/372.1

(58) Field of Classification Search
USPC ........ 396/419, 428, 421; 348/373; 248/372.1, 248/127, 176.1, 177.1, 178.1, 187.1
See application file for complete search history.

(56) References Cited

U.S. PATENT DOCUMENTS

| 4,955,568 A | 9/1990 | O'Connor et al. |
| 5,389,972 A | 2/1995 | Cartoni |

FOREIGN PATENT DOCUMENTS

| EP | 1640653 A1 | 3/2006 |
| GB |  428025 A | 5/1935 |
| GB | 2189042 A | 10/1987 |
| GB | 2231548 A | 11/1990 |
| WO | WO02086376 A1 | 10/2002 |

OTHER PUBLICATIONS

UK Intellectual Property Office Search Report, GB Application No. 0905470.1, dated Jul. 8, 2009.
UK Intellectual Property Office Search Report, GB Application No. 1005391.6, dated Jul. 22, 2010.

*Primary Examiner* — Rochelle-Ann J Blackman
(74) *Attorney, Agent, or Firm* — Fellers, Snider, Blankenship, Bailey & Tippens, P.C.

(57) ABSTRACT

A pan and tilt head for supporting a payload such as a TV, video or motion picture camera comprising a base and a tiltable support including a platform for receiving a payload pivotally mounted on the base to tilt about a horizontal axis to either side of a neutral position in which the platform is generally horizontal. A balancing mechanism for the platform includes an adjustable spring mechanism mounted on the base to enable a pre-load in the spring mechanism to be varied and means coupling the tilting support to the spring mechanism. Adjustable mounting for one end of the spring mechanism includes an upright post mounted on the base and having rotary height adjustment. A manually operable rotary thumb wheel is mounted on the base for rotation about an upright axis.

17 Claims, 8 Drawing Sheets

PAN AND TILT HEADS

CROSS-REFERENCE TO RELATED APPLICATIONS

The application claims priority to United Kingdom Patent Application No. 0905470.1 filed 30 Mar. 2009 which is incorporated herein by specific reference.

BACKGROUND OF THE INVENTION

1. The Field of the Invention

This invention relates to pan and tilt heads for supporting a payload such as a TV, video or cine camera on a tripod, pedestal or other form of mounting.

2. The Relevant Technology

Our UK Patent Publication No. 2189042 discloses a tiltable mounting for a TV or video camera comprising a base, a tiltable support member pivoted thereto and reactionary moment producing means located between and operated from said base and tiltable support member to produce a reaction equal to the out of balance moment generated by the weight of an article mounted on said tiltable support member as said centre of gravity moves about the vertical. The means for producing the reactionary moment comprises a horizontally extending spring guide mounted on the base carrying a compression spring acting between a slide and an end stop. The slide is excentrically coupled to the support member with respect to the tilt axis so that tilting of support member with respect to the tilt axis so that tilting of the support causes the slide to compress the spring and produce a force to counterbalance the out of balance moment produced as the centre of gravity of an article mounted on the tiltable support member rotates about the vertical. The spring guide has a rotary adjusting device connected to the guide by a lead screw to preload the spring in relation to the weight and position of the centre of gravity of the article on the support which is located on a vertical member of the space on the rearward side of the head. Since very high loads are required in the spring to provide the requisite counterbalancing force, the effort required to rotate the adjustment device is considerable. Moreover the tiltable support covers the adjustment device when the support is tilted rearwardly making it impossible to effect an adjustment when the supported is in that position.

SUMMARY OF THE INVENTION

This invention provides a pan and tilt head for supporting a payload (such as a TV, video or cine camera) the head comprising a base, a tiltable support including a platform for receiving a payload pivotally mounted on the base to tilt about a horizontal axis to either side of a neutral position in which the platform is generally horizontal and a balancing mechanism for the platform comprising an adjustable spring mechanism adjustably mounted at one end on the base to enable a pre-load in the spring mechanism to be varied and means to couple the tilting support to the spring mechanism so that tilting of the support produces a reaction force in the spring which fully counterbalances the support throughout its range of tilt to either side of the neutral position, wherein adjustable mounting for one end of the spring mechanism includes an upright post mounted on the base and having a rotary height adjustment mechanism to raise and lower the post to vary a pre-loaded spring force in the spring mechanism to suit the payload on the support, and a manually operable rotary member mounted on the base for rotation about an upright axis having a stepped down drive to the height adjustment mechanism to provide a mechanical advantage in the rotation of the height adjustment mechanism for ease of operation of the mechanism.

In one arrangement according to the invention the height adjustment mechanism for the post may comprise a screw jack on the base acting on the lower end of the post.

According to a further feature of the invention the stepped down drive from the manually operable rotary member to the rotary height adjustment mechanism may comprise a stepped down gear train, a chain and sprocket drive, or a belt and wheel drive.

In the case where the stepped drive is a gear train between the manually operable member and the rotary adjustment device, the gear train may comprise a pinion mounted on the axis of rotation of the member engaging in an internal ring gear connected to the height adjustment mechanism.

In the latter arrangement the height adjustment mechanism may comprise a lead screw mounted on the base for rotation about an upright axis, and an internal screw thread in the lower end of the post with which the lead screw engages for adjustment of the post height and thereby the pre-load the spring mechanism.

More specifically the ring gear may be co-axial with and connected to the lead screw of the height adjustment mechanism.

In either of the latter arrangements the spring mechanism may comprise an elongate guide member pivotally connected at one end to the upright post of adjustment mechanism and having an end stop for a spring at the other end, a compression spring encircling the guide member engaging the end stop at one of the spring and a slide member on the guide engaging the other end of the spring, the slide member being pivotally mounted to the tiltable support eccentrically from the axis of rotation of the support whereby rotation of the support moves the slide along the guide member to compress the spring and thereby generate the resistance to tilting of the support to counterbalance the support fully in any position of adjustment to which it is moved.

In any of the above arrangements the manually operable rotary member may be a thumb wheel mounted for rotation on the base of the head.

More specifically the base may have a housing enclosing the height adjustment mechanism and a slot is provided in the housing wall on one side of the base from which a peripheral part of the thumb wheel projects for operation of the thumb wheel.

DETAILED DESCRIPTION OF THE PREFERRED EMBODIMENTS

Figure 1:
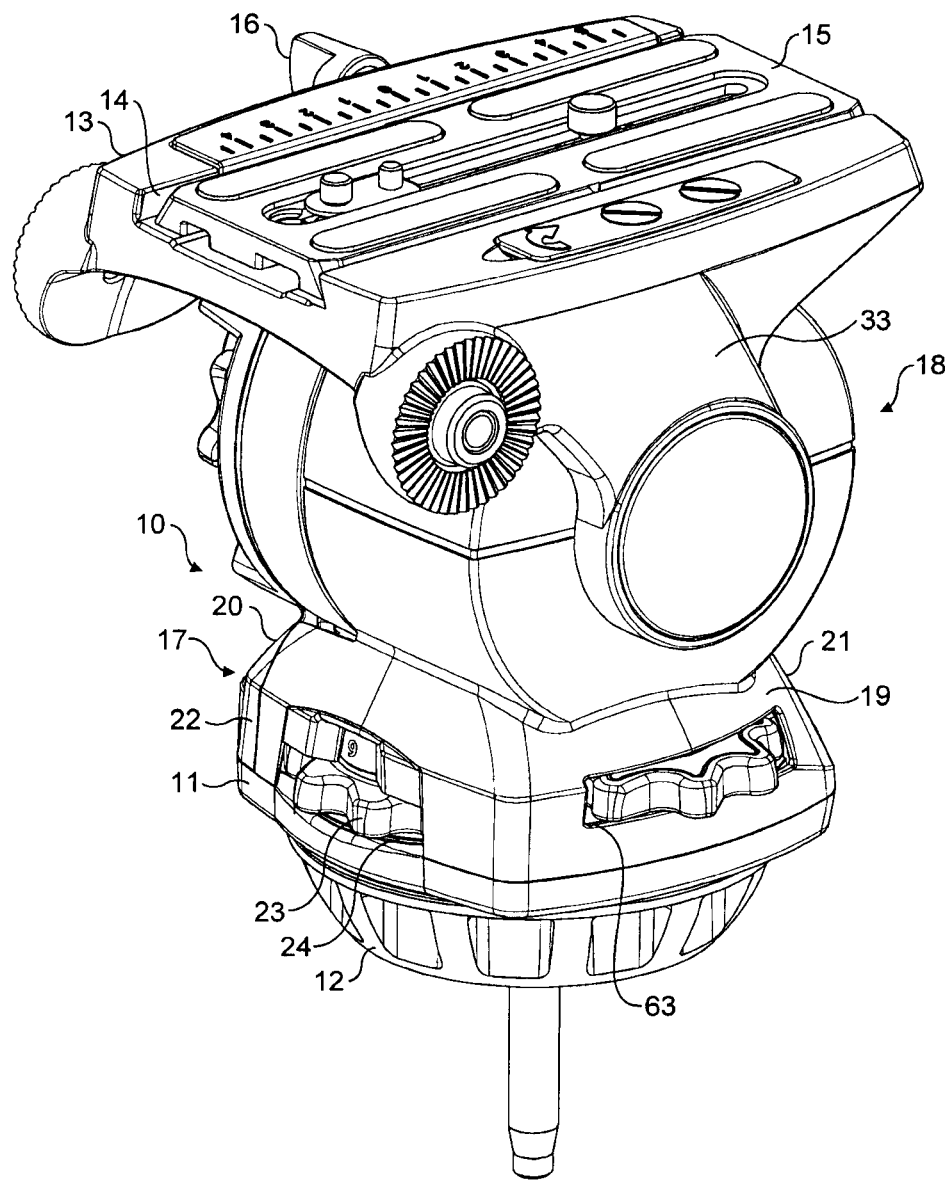
FIG. 1 is a perspective view of a pan and tilt head for a TV, video camera showing one side and the rear of the head.
Figure 2:
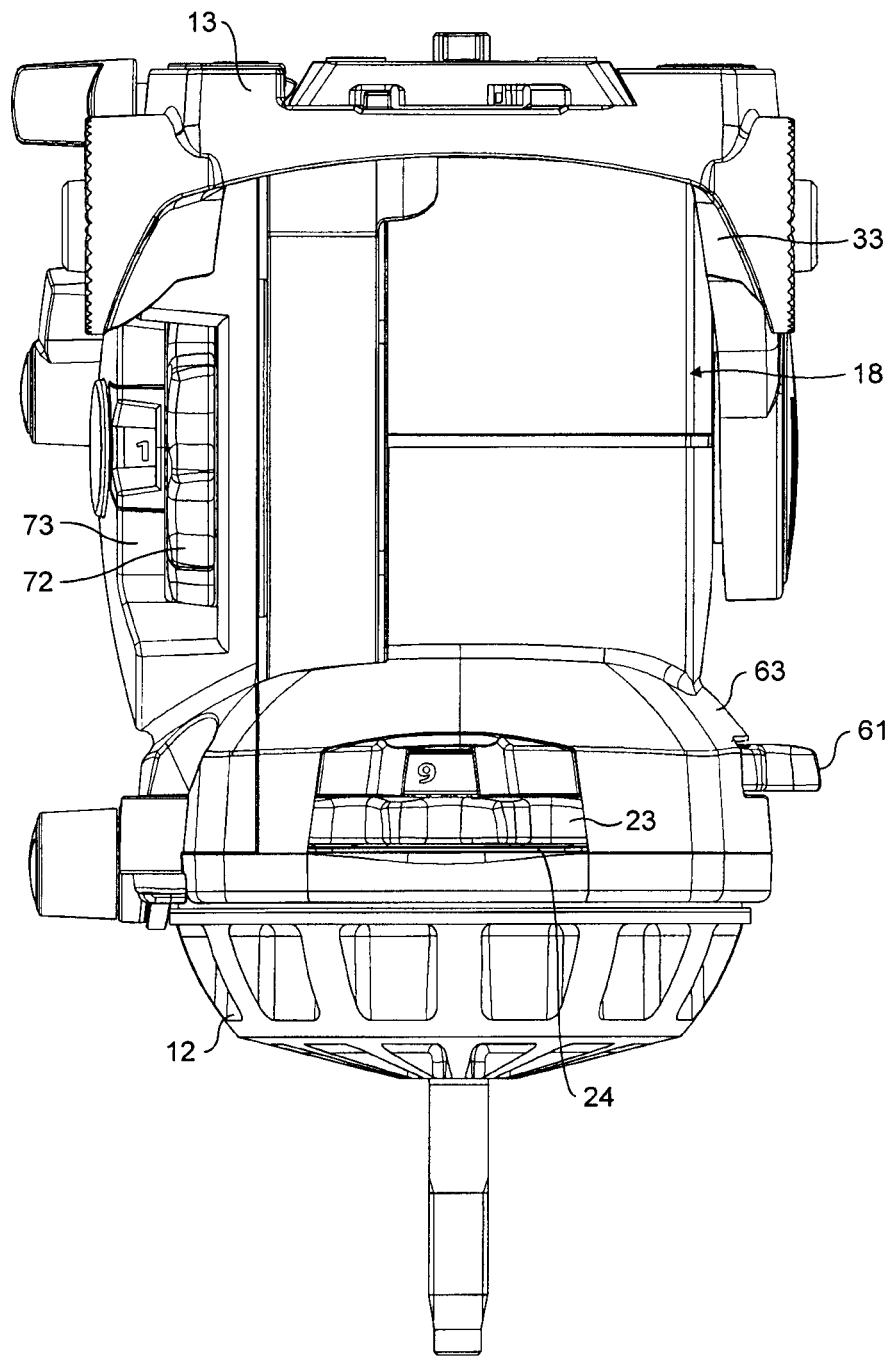
FIG. 2 is a rear view of the head as shown in FIG. 1.
Figure 3:
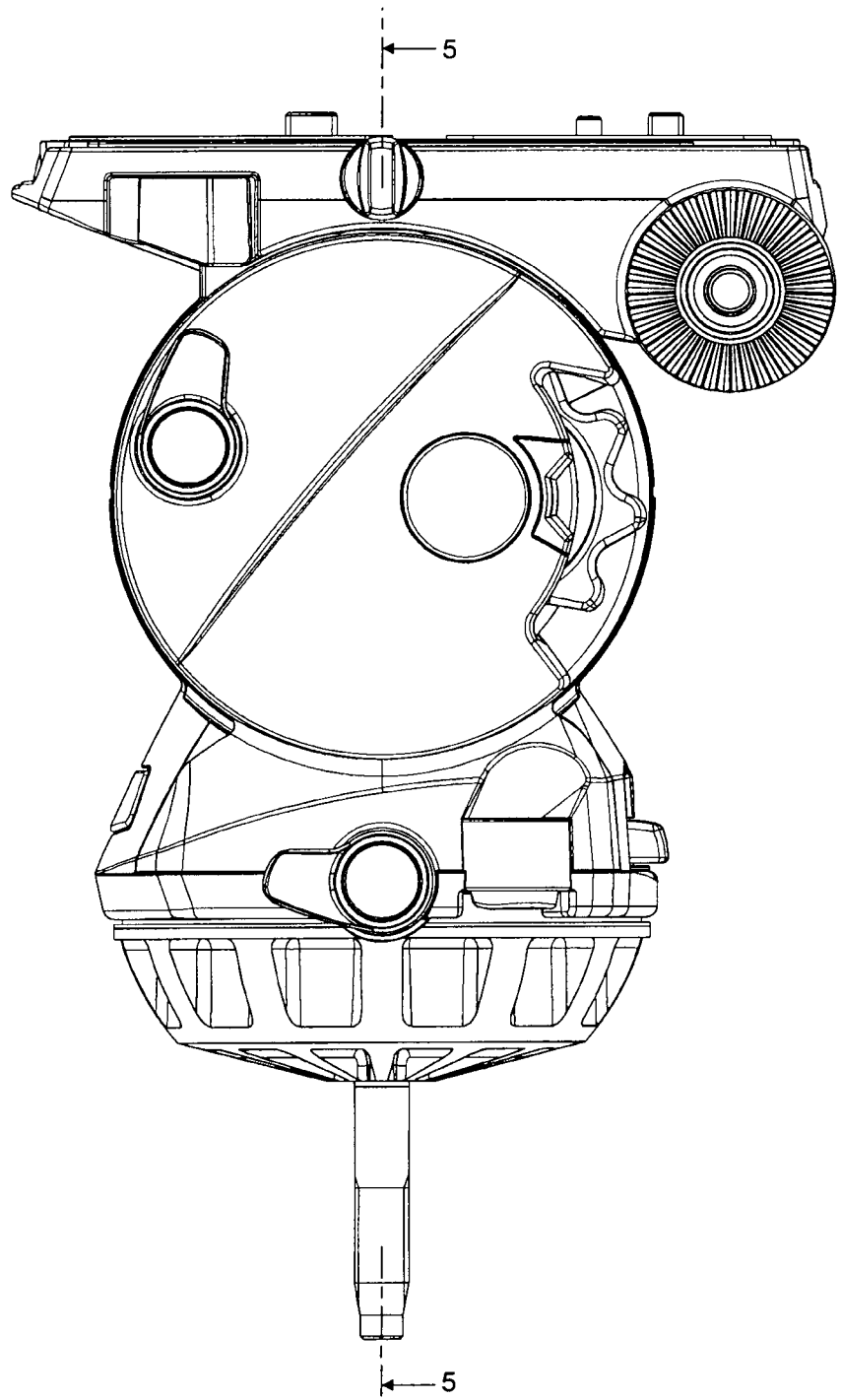
FIG. 3 is a side view of the head as shown in FIG. 1.
Figure 4:
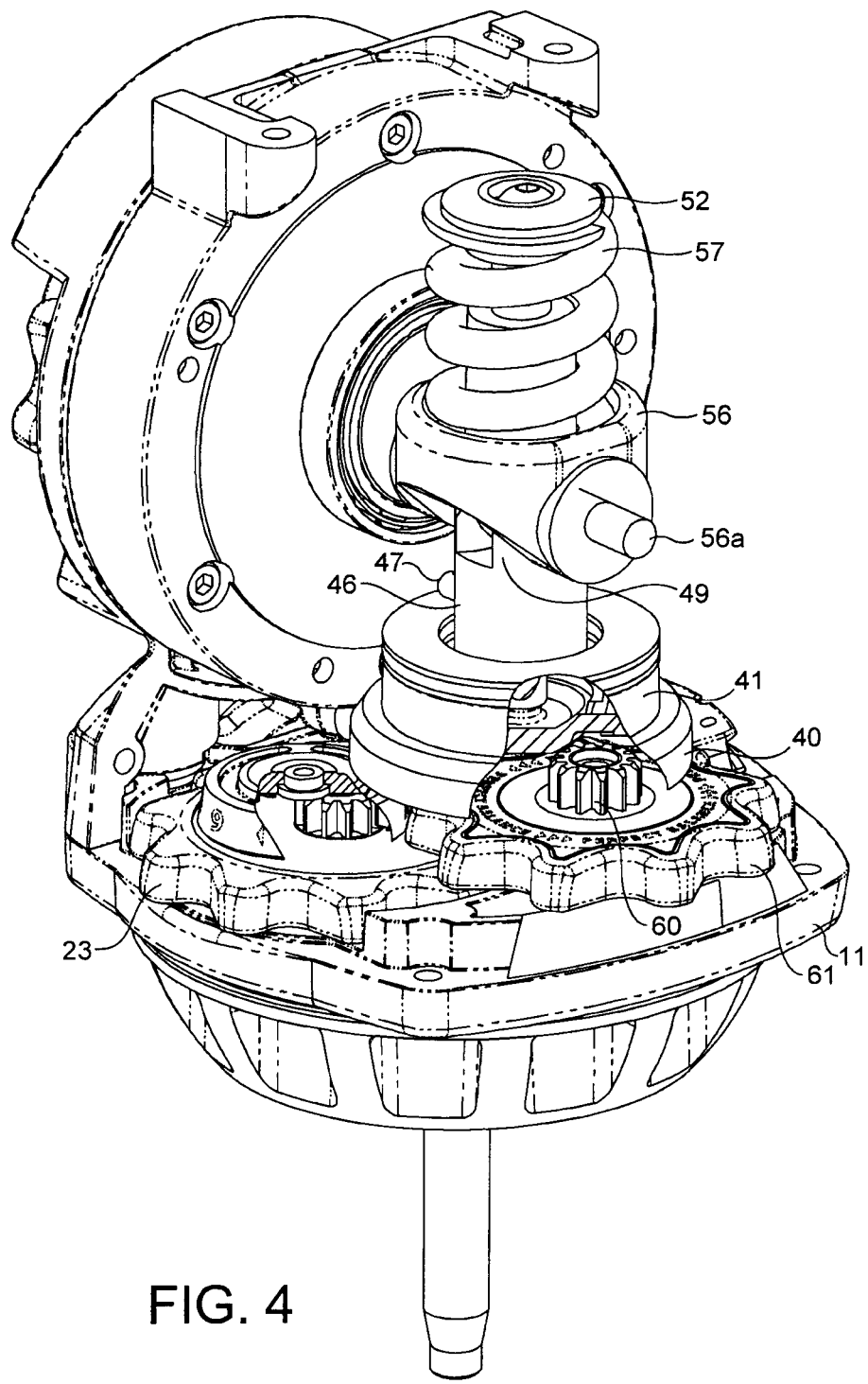
FIG. 4 is a similar view to FIG. 1 with a housing and part of the platform for a camera removed to expose a balancing mechanism for the head.

As indicated above, this invention relates to tiltable mountings, and more particularly, though not exclusively, to tilting mountings for supporting articles such as television cinematograph or electronic news gathering cameras in such a manner that the articles may be smoothly and easily tilted, i.e., the extremities of the article in a longitudinal plane change their angle of elevation relative to the C of G; i.e. centre of gravity; of the article. A camera panning head has the further function of permitting a camera to be panned i.e. turned to and fro, or rotated about, a vertical axis. Hereinafter the invention is described with reference to a camera, but it will be understood that other articles may be mounted on such tilting mountings.

In our GB-A-2096345, incorporated herein by reference, we disclose an apparatus providing such a tiltable mounting.

Referring to GB Patent No. 2096345, page 2, lines 24-39 the energy stored in the spring is given as $Ka^2(1-\cos\theta_s)$ where "a" is the lengths of links AC and CD. In this application if AC and CD are made unequal e.g. "a" and "b", then the energy stored in the spring for angle ACD changing from 0 to $\theta_s$ is Energy stored=$Kab(1-\cos\theta_s)$ and the amount of compensation to obtain counterbalance may be varied by adjusting dimensions "a" or "b" or by changing the rate of the spring or any combination thereof. By permitting "a" and/or "b" to be variable a simplified structure may be manufactured.

In our GB-A-2189042, incorporated herein by reference, we disclose a tiltable mounting comprising a base, a tiltable support member pivoted thereto and reactionary moment producing means located between and operated from said base and tiltable support member to produce a reaction equal to the out of balance moment generated by the weight of an article mounted on said tiltable support member as said C of G moves about the vertical. More specifically the tiltable mounting comprises a base, a tiltable support member pivoted thereto, mounting means on said tiltable support member for excentrically locating a pivotable slide means, mounting means on said base for pivotably locating a spring guide means having a spring compression means thereon, and a spring located on said spring guide means compressible between said slide means and said spring compression means wherein the reactionary moment at the tiltable support member produced by the action of the pivotable slide means and spring combined is equal to the out of balance moments produced as the C of G of an article mounted on said tiltable support member rotates about the vertical.

Reference is now made to FIGS. 1 to 8 of the accompanying drawings which illustrate a pan and tilt head in accordance with the present invention.

The pan and tilt head comprises a base indicated generally at 10 comprising a chassis on which components of the base are mounted including a base plate 11 below which there is a mounting 12 on which the base plate is rotatable about a vertical axis for pan movement of the head. The mounting is adapted to be secured in the head of a tripod, pedestal or other mounting arrangement. A platform 13 for receiving a TV, video or cinematic camera is pivotably mounted about a horizontal axis on the chassis to provide tilt movement of the camera which is fully counterbalanced by an adjustable spring mechanism.

As indicated above, the head 10 is supported on the mounting 12 by a bearing arrangement which provides rotation of the head about a vertical axis for pan movement of the camera on the platform. The pan movement is controlled by a variable drag/damper arrangement of the type described and illustrated in our Euro (UK) Patent Publication No. 0850382 acting between the chassis and mounting 12.

The base 10 has a lower housing indicated at 17 mounted on the base plate 11 and an upper housing indicated at of part annular form located on the lower housing and disposed below the platform 13 to house the mechanisms for controlling pan and tilt movement of the head. The lower housing 17 has side walls 19 and 20 and front and rear walls 21 and 22. The drag/damper device for controlling pan movement of the head is adjusted by a thumb wheel 23 a portion of the periphery of which projects through a slot 24 formed in the rear wall 22 of the housing to be adjusted by the camera operator as required.

Figure 5:
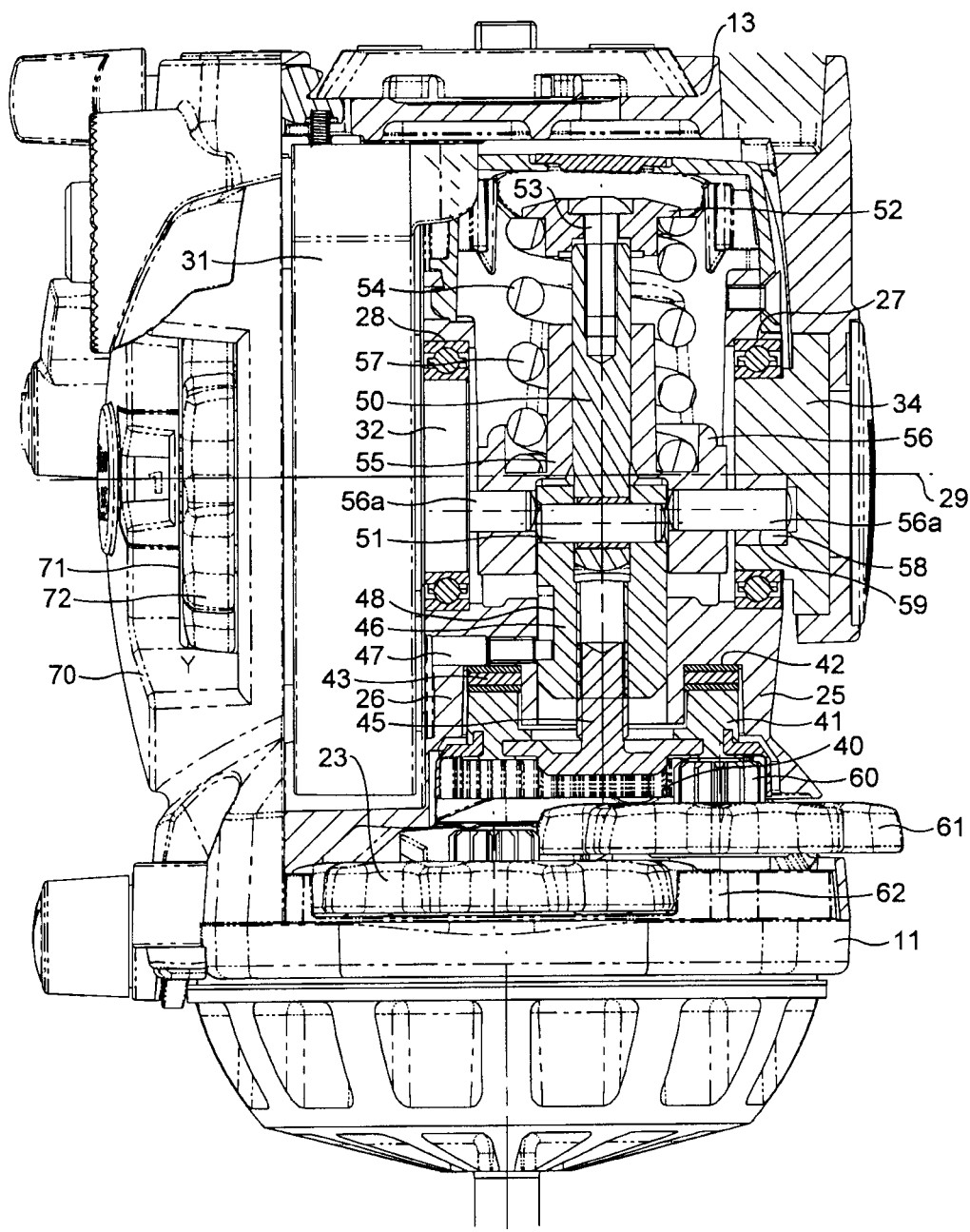
FIG. 5 is a section through the head on the line 5-5 on FIG. 3.

The base 11 of the chassis of the head has a pair of upstanding side walls 25, 26 as best seen in FIG. 5 in which a pair of large diameter ball race bearings 27, 28 respectively are mounted coaxially on horizontal axis 29 in the upstanding side walls 25 and 26 of the chassis.

The platform 13 has a dependent annular housing 31 on one side of the platform formed with a projecting stub shaft 32 which engages and is supported for rotation in bearing 28. The other side of the platform 13 has a dependent flange 33 having a stub shaft 34 at its lower end which engages in the bearing 27. The platform is thereby supported for tilting movement about the horizontal axis 29 on the chassis.

The mechanism for counterbalancing the tilt of the platform and camera mounted on the platform so that the camera can be tilted to any position in its range of travel and will stay in that position is generally as described and illustrated in GB-A-2189042, incorporated herein by reference, except that in the case of the present invention the spring arrangement which resists tilting of the platform is aligned generally vertically rather than horizontally as in the previous arrangement. The arrangement of the present invention will now be described in greater detail with reference to FIGS. 3 to 8.

An internal gear 40 is mounted on the chassis above the base plate 11 and the underside of the hub 41. The hub projects into an annular cavity 42 formed in the lower part of the chassis and a roller bearing 43 is mounted at the bottom of the cavity to support the annular hub 41 for rotation about the vertical axis indicated at 44.

At the centre of the hub 41 there is an upright post comprising an upstanding lead screw 45 which engages in an internally threaded upwardly extending sleeve 46 to provide a vertically acting screw jack. Vertical travel of the sleeve part of the post is limited by a horizontally extending pin 47 mounted on the chassis and engaging in a vertical slot 48 in the sleeve.

The sleeve has a forked upper end 49 which has a hinged connection to a lower end of an elongate slide member 50 by a horizontal pin 51. The upper end of the slide 50 has an end cap 52 secured by a bolt 53. A slide in the form of a sleeve 55 is located on slide member 50. The sleeve has a cup shaped seat 56 at its lower end to receive the lower end of a heavy compression spring 57 the upper end of which engages the cap 52.

The cup shaped housing 56 is formed with an outwardly extending pair of pivot pins 56a which engage in bearings 58 formed in eccentric bores 59 in the 32 and 34.

Figure 6:
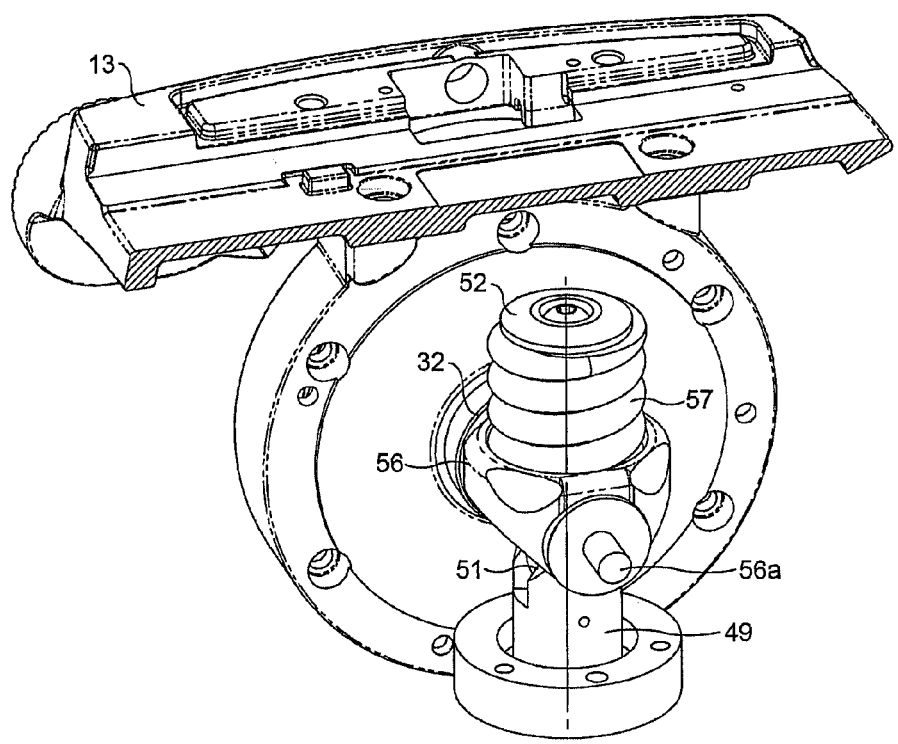
FIGS. 6 to 8 show the essential parts of the platform counterbalancing mechanism in neutral and tilted position to either side of neutral.
Figure 7:
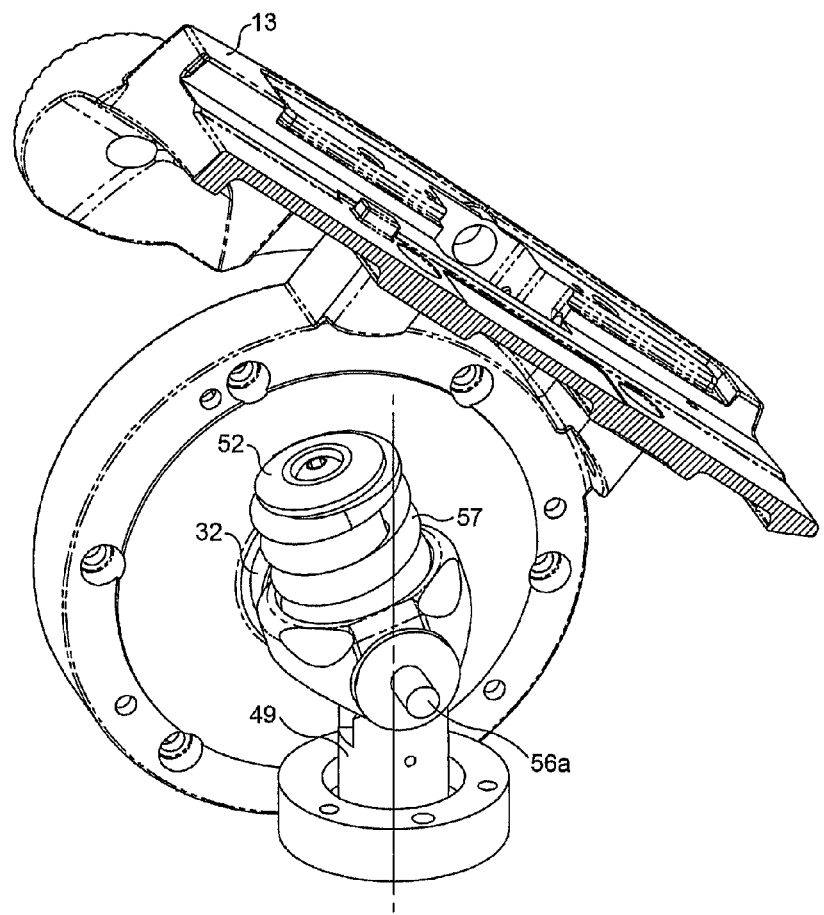
Figure 8:
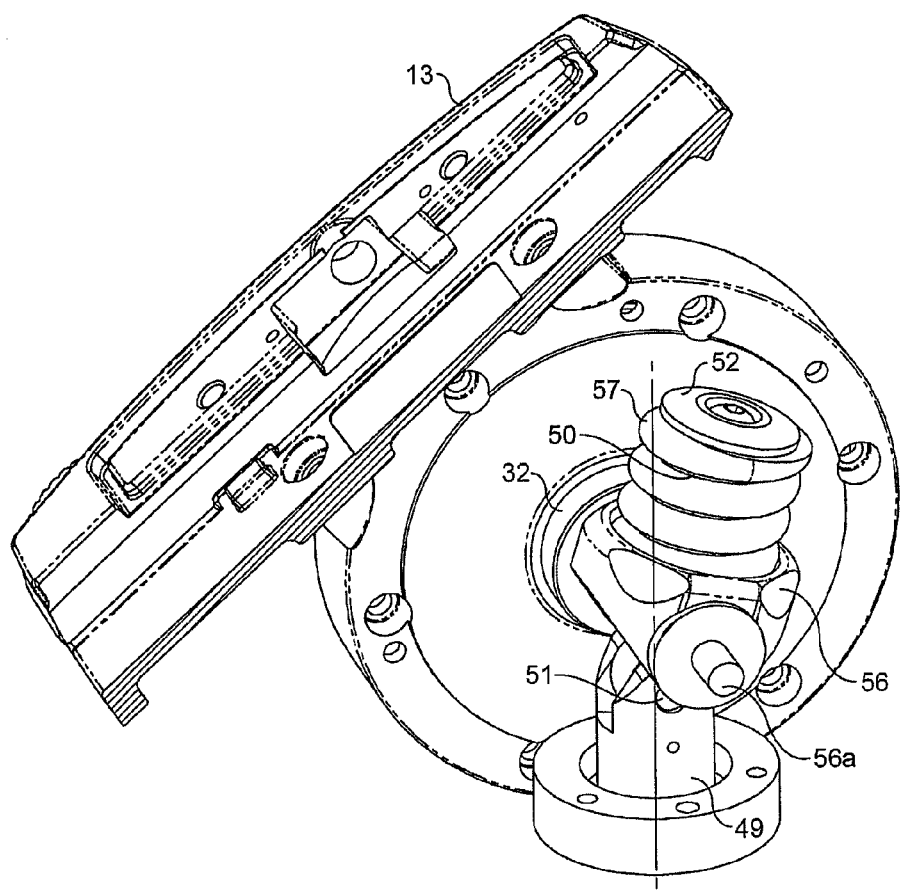

Referring to FIGS. 6 to 8 of the drawings, as the platform 13 tilts in one direction on its bearings 27 and 28, the pivot pins 56a will turn with the platform but because they are located eccentrically with respect to the axis 29 of rotation of the platform, the pins will cause the housing 56 to tilt the slide member 50 about pin 51 and, because of the geometry of the arrangement, to rise up the slide member 50 compressing the spring 57. The resulting reaction force counterbalances the platform so that the platform will remain stationary in any position to which it is moved throughout its range of travel.

FIG. 6 shows the platform in the "neutral", horizontal position with slide 50 vertical and FIGS. 7 and 8 show the platform tilted at 40° to either side of neutral with the slide 50 tilted in the respective opposite direction. Reference should be made to our GB-A-2189042 for a more detailed explanation of the geometry and manner in which the arrangement provides a perfectly balanced platform throughout its range of tilt movement.

The lead screw 45 rotated by the ring gear 40 at the lower end of the housing adjusts the position of the slide 50 with respect to the housing 56 and thereby adjusts the initial compression of the spring 54 to cater for cameras of different weights on the platform so that whatever the camera weight, the platform can be perfectly balanced. The ring gear is itself adjusted by a pinion 60 governed by a thumb wheel 61. The thumb wheel is mounted to rotate about an axis 62 on the chassis offset laterally from the axis 44 of the ring gear so that a portion of the thumb wheel projects outwardly from the side of the chassis through an aperture 63 formed in the side wall 19 of the lower housing. The gearing between the pinion 60 and ring gear provides a substantial step down in ratio from the pinion to the ring gear and this coupled with the large diameter of the thumb wheel 61 provides a substantial mechanical advantage for the operator in rotating the lead screw 45. It will be appreciated that the lead screw 45 is subjected through the sleeve 46 to substantial axial force by the compression spring 57 and so the substantial mechanical advantage provided for the thumb wheel 61 significantly enhances the ease by which the preload in the spring 54 can be adjusted by the operator. In addition because the thumb wheel is acted on from the side of the housing rather than the rear wall of the housing as in the arrangement of our British Patent Specification No. 2189042, the spring force can always be adjusted whatever the position of tilt of the platform is moved to.

The chassis has an upstanding side housing 70 outside the annular hub 31 of the platform 13 in which a further drag device for controlling hand movement of the head is mounted. The housing has an aperture 71 from which a further thumb wheel for adjusting the drag/damper device projects. The housing also carries control members 73, 74 for locking the pan and tilt head against pan and tilt movement when required through conventional locking arrangements.

It will be appreciated that many modifications may be made to the above described embodiment without departing from the scope of the invention. Other forms of linear resistance devices can be used in place of a coil spring and the spring could be operated in tension rather than compression. In addition parallel spring arrangements could be used as described in our British Patent Publication No. 2189042. Also different stepped drives could be provided between the thumb wheel for adjusting the lead screw for the slide such as a chain and sprocket drive or a toothed wheel and belt drive in which the sprocket or wheel sizes are selected to provide the required step down ratio from the thumb wheel to the lead screw. Also other forms of member can be provided for rotating the pinion such as a lever.

The invention claimed is:

1. A pan and tilt head for supporting a payload the head comprising a base, a tiltable support including a platform for receiving a payload pivotally mounted on the base to tilt about a horizontal axis to either side of a neutral position in which the platform is generally horizontal and a balancing mechanism for the platform comprising an adjustable spring mechanism adjustably mounted at one end on the base to enable a pre-load in the spring mechanism to be varied and means to couple the tilting support to the spring mechanism so that tilting of the support produces a reaction force in the spring which fully counterbalances the support throughout its range of tilt to either side of the neutral position, wherein the adjustable mounting for one end of the spring mechanism includes an upright post mounted on the base and having a rotary height adjustment mechanism to raise and lower the post to vary a pre-loaded spring force in the spring mechanism to suit the payload on the support, and a manually operable rotary member mounted on the base for rotation about an upright axis having a stepped down drive to the height adjustment mechanism to provide a mechanical advantage in the rotation of the height adjustment mechanism for ease of operation of the mechanism.

2. A pan and tilt head as claimed in claim 1, wherein the height adjustment mechanism for the post comprises a screw jack on the base acting on the lower end of the post.

3. A pan and tilt head as claimed in claim 1, wherein the stepped down drive from the manually operable rotary member to the rotary height adjustment mechanism comprises a stepped down gear train.

4. A pan and tilt head as claimed in claim 1, wherein the stepped down drive from the manually operable rotary member to the rotary height adjustment mechanism comprises a chain and sprocket drive.

5. A pan and tilt head as claimed in claim 1, wherein the stepped down drive from the manually operable rotary member to the rotary height adjustment mechanism comprises a belt and wheel drive.

6. A pan and tilt head as claimed in claim 3, wherein the gear train between the manually operable member and the rotary adjustment device comprises a pinion mounted on the axis of rotation of the member engaging in an internal ring gear connected to the height adjustment mechanism.

7. A pan and tilt head as claimed in claim 6, wherein the height adjustment mechanism comprises a lead screw mounted on the base for rotation about an upright axis, and an internal screw thread in the lower end of the post with which the lead screw engages for adjustment of the post height and thereby the pre-load the spring mechanism.

8. A pan and tilt head as claimed in claim 7, wherein the ring gear is co-axial with and is connected to the lead screw of the height adjustment mechanism.

9. A pan and tilt head as claimed in claim 7, wherein the spring mechanism comprises an elongate guide member pivotally connected at one end to the upright post of adjustment mechanism and having an end stop for a spring at the other end, a compression spring encircling the guide member engaging the end stop at one of the spring and a slide member on the guide engaging the other end of the spring, the slide member being pivotally mounted to the tiltable support eccentrically from the axis of rotation of the support whereby rotation of the support moves the slide along the guide member to compress the spring and thereby generate the resistance to tilting of the support to counterbalance the support fully in any position of adjustment to which it is moved.

10. A pan and tilt head as claimed in claim 1, wherein the manually operable rotary member is a thumb wheel mounted for rotation on the base of the head.

11. A pan and tilt head as claimed in claim 10, wherein the base has a housing enclosing the height adjustment mechanism and a slot is provided in the housing wall on one side of the base from which a peripheral part of the thumb wheel projects for operation of the thumb wheel.

12. A pan and tilt head for supporting a payload, the head comprising: a base, a tiltable support including a platform for receiving a payload pivotally mounted on the base to tilt about a horizontal axis to either side of a neutral position in which the platform is generally horizontal and a balancing mechanism for the platform comprising an adjustable spring mechanism adjustably mounted at one end on the base to enable a pre-load in the spring mechanism to be varied and means to couple the tilting support to the spring mechanism so that tilting of the support produces a reaction force in the spring which fully counterbalances the support throughout its range of tilt to either side of the neutral position, wherein the adjustable mounting for one end of the spring mechanism includes an upright post mounted on the base and having a screw jack on the base acting on the lower end of the post to raise and lower the post to vary a pre-loaded spring force in the spring mechanism to suit the payload on the support, and a manually operable rotary member mounted on the base for rotation about an upright axis having a stepped down drive to the height adjustment mechanism to provide a mechanical advantage in the rotation of the height adjustment mechanism for ease of operation of the mechanism.

13. A pan and tilt head for supporting a payload, the head comprising: a base, a tiltable support including a platform for receiving a payload pivotally mounted on the base to tilt about a horizontal axis to either side of a neutral. position in which the platform is generally horizontal and a balancing mechanism for the platform comprising an adjustable spring mechanism adjustably mounted at one end on the base to enable a pre-load in the spring mechanism to be varied and means to couple the tilting support to the spring mechanism so that tilting of the support produces a reaction force in the spring which fully counterbalances the support throughout its range of tilt to either side of the neutral position, wherein the adjustable mounting for one end of the spring mechanism includes an upright post mounted on the base and having a rotary height adjustment mechanism to raise and lower the post including a lead screw mounted on the base for rotation about an upright axis, and an internal screw thread in the lower end of the post with which the lead screw engages for adjustment of the post height and thereby pre-load the spring mechanism to suit the payload on the support, and a manually operable rotary member mounted on the base for rotation about an upright axis having a stepped down gear train including a pinion mounted on the axis of rotation of the member engaging in an internal ring gear connected to the height adjustment mechanism to provide a mechanical advantage in the rotation of the height adjustment mechanism for ease of operation of the mechanism.

14. A pan and tilt head as claimed in claim 13, wherein the ring gear is co-axial with and is connected to the lead screw of the height adjustment mechanism.

15. A pan and tilt head as claimed in claim 13, wherein the spring mechanism comprises an elongate guide member pivotally connected at one end to the upright post of adjustment mechanism and having an end stop for a spring at the other end, a compression spring encircling the guide member engaging the end stop at one of the spring and a slide member on the guide engaging the other end of the spring, the slide member being pivotally mounted to the tiltable support eccentrically from the axis of rotation of the support whereby rotation of the support moves the slide along the guide member to compress the spring and thereby generate the resistance to tilting of the support to counterbalance the support fully in any position of adjustment to which it is moved.

16. A pan and tilt head as claimed in claim 13, wherein the manually operable rotary member is a thumb wheel mounted for rotation on the base of the head.

17. A pan and tilt head as claimed in claim 16, wherein the base has a housing enclosing the height adjustment mechanism and a slot is provided in the housing wall on one side of the base from which a peripheral part of the thumb wheel projects for operation of the thumb wheel.

* * * * *